US012306559B2

(12) United States Patent
Ogino et al.

(10) Patent No.: US 12,306,559 B2
(45) Date of Patent: May 20, 2025

(54) SCRAPING DEVICE AND IMAGE FORMING APPARATUS INCLUDING AN APPLYING PART TO APPLY AN IMPACT TO A SCRAPING PART

(71) Applicant: FUJIFILM Business Innovation Corp., Tokyo (JP)

(72) Inventors: Takuya Ogino, Kanagawa (JP); Akira Shimodaira, Kanagawa (JP); Yukihiro Ichiki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/163,028

(22) Filed: Feb. 1, 2023

(65) Prior Publication Data

US 2024/0103405 A1 Mar. 28, 2024

(30) Foreign Application Priority Data

Sep. 26, 2022 (JP) ................................. 2022-153048

(51) Int. Cl.

| | |
|---|---|
| ***G03G 15/16*** | (2006.01) |
| ***G03G 21/00*** | (2006.01) |
| ***G03G 21/10*** | (2006.01) |
| ***G03G 21/16*** | (2006.01) |

(52) U.S. Cl.

CPC ....... *G03G 15/161* (2013.01); *G03G 21/0011* (2013.01); *G03G 21/0029* (2013.01); *G03G 21/007* (2013.01); *G03G 21/0076* (2013.01); *G03G 21/105* (2013.01); *G03G 21/168* (2013.01); *G03G 21/169* (2013.01); *G03G 2215/1661* (2013.01); *G03G 2221/0021* (2013.01); *G03G 2221/0089* (2013.01); *G03G 2221/1618* (2013.01); *G03G 2221/1627* (2013.01)

(58) Field of Classification Search

CPC ........... G03G 21/0011; G03G 21/0029; G03G 21/007; G03G 21/0076; G03G 21/105; G03G 21/161; G03G 21/168; G03G 21/169; G03G 2215/1661; G03G 2221/0021; G03G 2221/0089; G03G 2221/1618; G03G 2221/1627

See application file for complete search history.

(56) References Cited

U.S. PATENT DOCUMENTS

| | | | | |
|---|---|---|---|---|
| 8,862,043 B2 * | 10/2014 | Ikebata | G03G 21/105 | 399/256 |
| 2008/0310896 A1 * | 12/2008 | Shono | G03G 21/0029 | 399/350 |
| 2011/0097104 A1 * | 4/2011 | Sueoka | G03G 15/161 | 399/101 |

(Continued)

FOREIGN PATENT DOCUMENTS

| | | |
|---|---|---|
| JP | 5-188832 A | 7/1993 |
| JP | 2005-202122 A | 7/2005 |

*Primary Examiner* — Joseph S Wong
(74) *Attorney, Agent, or Firm* — Sughrue Mion, PLLC

(57) ABSTRACT

A scraping device includes: a scraping part that comes into contact with a rotating contact part to scrape off attached matter attached to the contact part; a rotation part that rotates; and an applying part that is attached to the rotation part, rotates with the rotation part, and strikes the scraping part to apply an impact to the scraping part.

17 Claims, 7 Drawing Sheets

(56) References Cited

U.S. PATENT DOCUMENTS

| | | | | |
|---|---|---|---|---|
| 2014/0356043 | A1* | 12/2014 | Tokuda | G03G 15/161 399/358 |
| 2015/0063887 | A1* | 3/2015 | Asaoka | G03G 21/105 399/353 |
| 2021/0132539 | A1* | 5/2021 | Inaba | G03G 15/161 |

* cited by examiner

SCRAPING DEVICE AND IMAGE FORMING APPARATUS INCLUDING AN APPLYING PART TO APPLY AN IMPACT TO A SCRAPING PART

CROSS-REFERENCE TO RELATED APPLICATIONS

This application is based on and claims priority under 35 USC 119 from Japanese Patent Application No. 2022-153048 filed Sep. 26, 2022.

BACKGROUND

(i) Technical Field

The present disclosure relates to a scraping device and an image forming apparatus.

(ii) Related Art

Japanese Unexamined Patent Application Publication No. 5-188832 discloses a cleaning device for an electrophotographic recording apparatus, the cleaning device including a cleaning member formed of a material obtained by imparting conductivity to a solid polymer lubricant, and a voltage applying part that applies a voltage to the cleaning member to cause the cleaning member to minutely vibrate.

Japanese Unexamined Patent Application Publication No. 2005-202122 discloses an image forming apparatus including: image forming units including image carriers configured to travel and developing devices that supply toner to the surfaces of the image carriers; a belt-like intermediate transfer body to which toner images formed by the image forming units are transferred and on which the images are combined; and a cleaning device that cleans residual toner on the intermediate transfer body after the toner images combined on the intermediate transfer body are transferred to a recording material. The intermediate transfer body includes a rubber elastic layer, the cleaning device includes a rotatable brush-like member, and a vibration of 20 Hz or more is applied to the brush-like member.

SUMMARY

A scraping device may include: a scraping part that comes into contact with a rotating contact part to scrape off attached matter attached to the contact part; and a vibration part that vibrates the scraping part by applying a voltage thereto to remove foreign matter caught between the scraping part and the contact part.

This scraping device requires a dedicated special power supply for applying a voltage, which makes the device expensive.

Aspects of non-limiting embodiments of the present disclosure relate to removing foreign matter caught between the contact part and the scraping part with a low-cost configuration as compared with a case where the scraping part is vibrated by application of a voltage.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a scraping device including: a scraping part that comes into contact with a rotating contact part to scrape off attached matter attached to the contact part; a rotation part that rotates; and an applying part that is attached to the rotation part, rotates with the rotation part, and strikes the scraping part to apply an impact to the scraping part.

BRIEF DESCRIPTION OF THE DRAWINGS

Exemplary embodiment of the present disclosure will be described in detail based on the following figures, wherein.

DETAILED DESCRIPTION

An exemplary embodiment of the present disclosure will be described below with reference to the drawings.

Image Forming Apparatus

Figure 1:
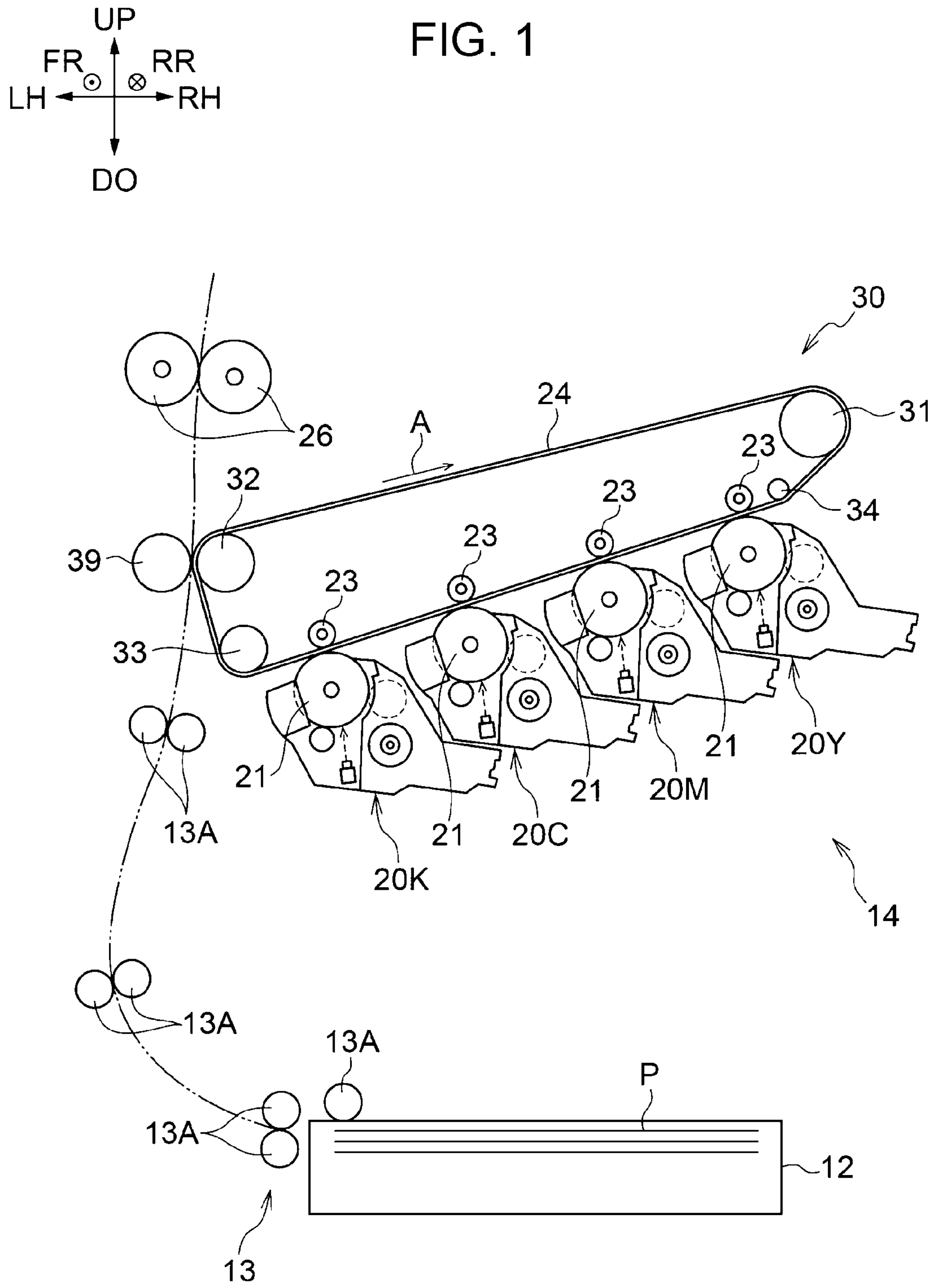
FIG. 1 schematically shows an image forming apparatus according to an exemplary embodiment.

The configuration of an image forming apparatus 10 according to an exemplary embodiment will be described. FIG. 1 schematically shows the image forming apparatus 10.

In the drawings, the arrow UP indicates the upper side (specifically, the vertically upper side) of the apparatus, and the arrow DO indicates the lower side (specifically, the vertically lower side) of the apparatus. The arrow LH indicates the left side of the apparatus, and the arrow RH indicates the right side of the apparatus. The arrow FR indicates the front side of the apparatus, and the arrow RR indicates the rear side of the apparatus. These directions are set for convenience of description, and the configuration of the apparatus is not limited thereto. Note that the term "apparatus" may be omitted when the directions of the apparatus are described. Specifically, for example, "the upper side of the apparatus" may be simply referred to as "the upper side".

In the following description, a "front-rear direction" may be used to mean "both the front and rear directions" or "one of the front and rear directions". Note that the "front-rear direction" may also be a side direction, a lateral direction, and a horizontal direction. The "left-right direction" may also be a side direction, a lateral direction, and a horizontal direction. The top-bottom direction, the left-right direction, and the front-rear direction intersect with one another (specifically, directions orthogonal to one another).

A mark composed of a circle and an x therein represents an arrow directed from the near side to the far side of the plane of the drawings. A mark composed of a circle and a dot therein represents an arrow directed from the far side to the near side of the plane of the drawings.

The image forming apparatus 10 shown in FIG. 1 is an apparatus that forms an image. Specifically, as shown in FIG. 1, the image forming apparatus 10 includes a medium storage part 12, a transport part 13, and an image forming unit 14 including a transfer device 30. The components of the image forming apparatus 10 will be described below.

Medium Storage Part and Transport Part

In the image forming apparatus 10, the medium storage part accommodates a recording medium P. The recording medium P accommodated in the medium storage part 12 will be transported to the image forming unit 14. The recording medium P stored in the medium storage part 12 is a target on which an image is will be formed by the image forming unit 14.

In this exemplary embodiment, paper is used as the recording medium P. Note that the recording medium P is not limited to paper. An example of the recording medium P is a film, and various recording media may be used. Examples of the film include a resin film and a metal film.

The transport part 13 shown in FIG. 1 transports a recording medium P accommodated in the medium storage part 12 to an output part (not shown). More specifically, as shown in FIG. 1, the transport part 13 includes multiple transport members 13A such as transport rollers, and transports the recording medium P with the transport members 13A. The transport members 13A may be, for example, a transport member such as a transport belt or a transport drum, and various transport members may be used.

Image Forming Unit

Figure 2:
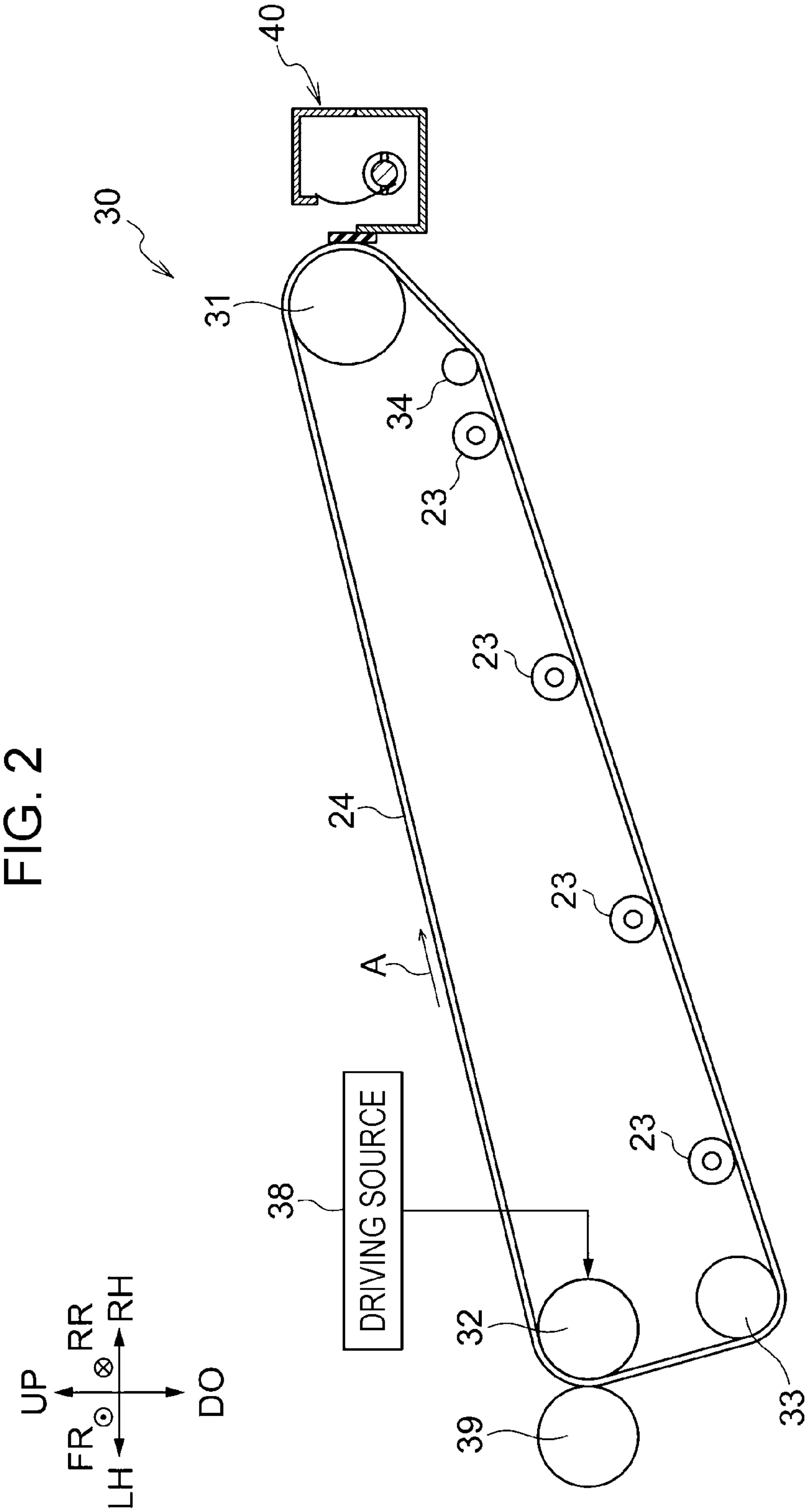
FIG. 2 schematically shows a transfer device according to the exemplary embodiment.

The image forming unit 14 as shown in FIG. 2 forms an image on a recording medium P transported by the transport part 13 (more specifically, the transport members 13A). In this exemplary embodiment, the image forming unit 14 forms a toner image on a recording medium P by an electrophotographic system. More specifically, as shown in FIG. 1, the image forming unit 14 includes toner-image forming units 20Y, 20M, 20C, and 20K (hereinbelow, 20Y to 20K), the transfer device 30 including a transfer belt 24, and a fixing unit 26.

Each of the toner-image forming units 20Y to 20K includes a photoreceptor 21. In the toner-image forming units 20Y to 20K, charging, exposure, and development are performed, so that toner images of yellow (Y), magenta (M), cyan (C), and black (K) are formed on the corresponding photoreceptors 21.

In the image forming unit 14, the transfer device 30 transfers toner images formed on the photoreceptors 21 of the toner-image forming units 20Y to 20K to the recording medium P via the transfer belt 24. The detailed configuration of the transfer device 30 will be described below.

In the image forming unit 14, the toner image transferred to the recording medium P is fixed to the recording medium P by the fixing unit 26. As described above, the image forming unit 14 uses an intermediate transfer system, in which an image is transferred to a recording medium P via the transfer belt 24.

Transfer Device

Next, the configuration of the transfer device 30 according to this exemplary embodiment will be described. FIG. 2 schematically shows the transfer device 30.

The transfer device 30 as shown in FIG. 2 is a device that transfers a toner image to a recording medium P. Specifically, as shown in FIG. 2, the transfer device 30 includes the transfer belt 24, winding rollers 31, 32, 33, and 34 (hereinbelow sometimes 31 to 34), a first transfer roller 23, a second transfer roller 39, and a scraping device 40. In FIG. 1, the illustration of the scraping device 40 is omitted.

The transfer belt 24 is an example of a contact part and an example of a holding member. The transfer belt 24 holds an image to be transferred to a recording medium P, the image being formed of toner. In other words, the transfer belt 24 holds a toner image to be transferred to a recording medium P. The toner image is an example of an image.

More specifically, as shown in FIG. 2, the transfer belt 24 is an endless belt formed in an annular shape. In this exemplary embodiment, the transfer belt 24 transfers, to a recording medium P, the toner images that have been transferred thereto from the photoconductors 21 of the toner-image forming units 20Y to 20K. As shown in FIG. 2, the transfer belt 24 is wound around the four winding rollers 31 to 34.

As a result of the winding roller 32 being rotationally driven by a driving source 38, such as a driving motor, the transfer belt 24 is rotated (circulated) in one direction (direction A in FIGS. 1 and 2). Although the winding roller 32, among the four winding rollers 31 to 34, is rotationally driven in this exemplary embodiment, it is only necessary that at least one of the four winding rollers 31 to 34 is rotationally driven to rotate the transfer belt 24.

As shown in FIGS. 1 and 2, four first transfer rollers 23 are provided in the transfer device 30. As shown in FIG. 1, the four first transfer rollers 23 face the photoconductors 21 of the toner-image forming units 20Y to 20K with the transfer belt 24 therebetween. Portions between the first transfer rollers 23 and the photoconductors 21 are first transfer positions where the toner images formed on the photoconductors 21 are transferred to the transfer belt 24.

The second transfer roller 39 faces the winding roller 32 with the transfer belt 24 therebetween. A portion between the second transfer roller 39 and the winding roller 32 is a second transfer position where the toner image transferred to the transfer belt 24 is transferred to a recording medium P.

In the transfer device 30, the toner images of the respective colors formed on the photoconductors 21 of the toner-image forming units 20Y to 20K are transferred to the rotating transfer belt 24 at the respective first transfer positions by the first transfer rollers 23. Then, the toner image transferred to the transfer belt 24 is transferred to a recording medium P at the second transfer position by the second transfer roller 39.

Scraping Device

Figure 3:
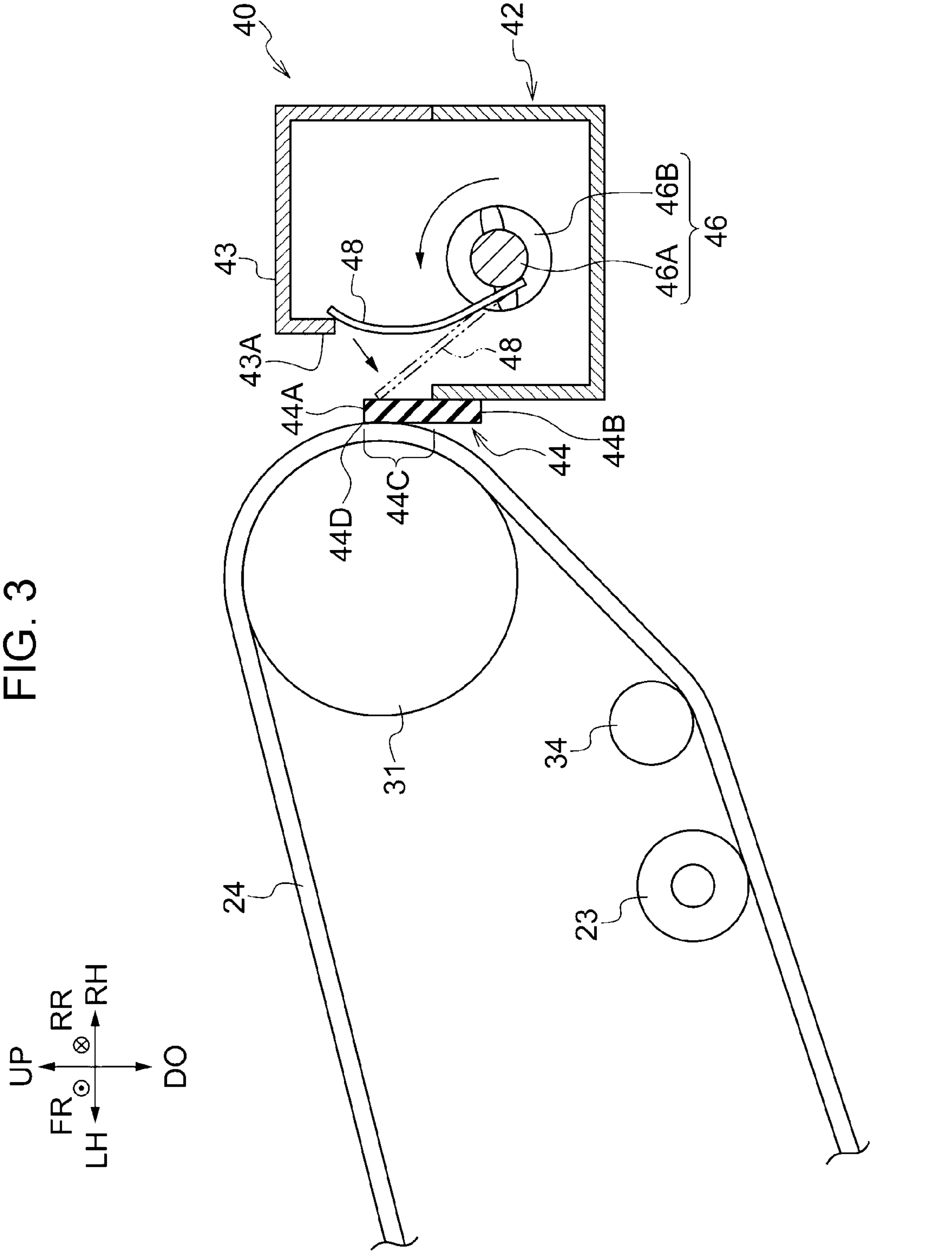
FIG. 3 schematically shows a scraping device according to the exemplary embodiment.

Next, the configuration of the scraping device 40 according to this exemplary embodiment will be described. FIG. 3 schematically shows the scraping device 40.

The scraping device 40 as shown in FIG. 3 is a device that scrapes off toner attached to the transfer belt 24. The toner is an example of attached matter. More specifically, as shown in FIG. 3, the scraping device 40 includes a housing 42, a blade 44, a transport part 46, elastic plates 48, and a releasing part 43.

Housing

The housing 42 as shown in FIG. 3 serves as a body in which components of the scraping device 40 are provided. As shown in FIG. 3, the housing 42 is formed in a box shape with an opening on the upper side. The housing 42 also functions as a storage part that stores the toner scraped off by the blade 44.

In this exemplary embodiment, as shown in FIG. 3, the transport part 46 and the elastic plates 48 are provided inside the housing 42. The blade 44 is provided outside the housing 42.

Blade

The blade 44 as shown in FIG. 3 is an example of a scraping part. The blade 44 comes into contact with the rotating transfer belt 24 to scrape off the toner attached to the transfer belt 24. The transfer belt 24 is an example of a contact part.

The blade 44 has a tip 44A (more specifically, an upper end) that is in contact with the transfer belt 24, and a base end 44B (more specifically, a lower end) that is supported by the housing 42. More specifically, a portion of the blade 44 near the base end 44B is fixed to the left side surface of the housing 42, and the tip 44A protrudes upward toward the transfer belt 24 from the housing 42.

The blade 44 is formed in a rectangular plate shape and has a certain length in the front-rear direction. The length of the blade 44 in the front-rear direction is greater than or equal to the length, in the front-rear direction, of an area in the transfer belt 24 to which a toner image is transferred. In this exemplary embodiment, the blade 44 is made of, for example, rubber.

When the transfer belt 24 rotates in a state in which a corner portion 44D (edge) of the tip 44A is in contact with the transfer belt 24, the blade 44 scrapes off the toner attached to the transfer belt 24. The toner scraped off by the blade 44 is accommodated in the housing 42 from the opening provided on the upper side of the housing 42. The housing 42 is an example of a holding part.

Transport Part

Figure 4:
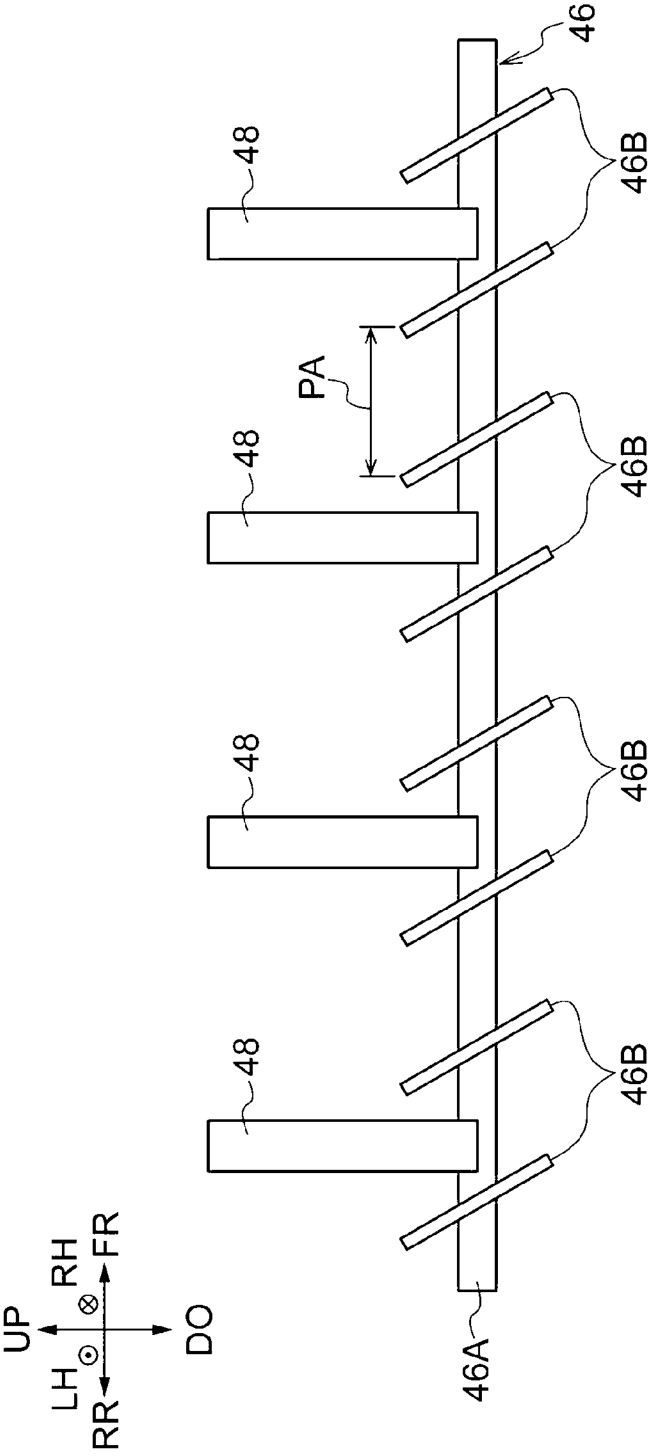
FIG. 4 is a side view of a transport part and elastic plates according to the exemplary embodiment.

The transport part 46 shown in FIG. 3 is an example of a rotation part that rotates. The transport part 46 transports the toner scraped off by the blade 44. The transport part 46 includes a transport member, such as a transport auger. In this exemplary embodiment, as shown in FIGS. 3 and 4, the transport part 46 includes a shaft 46A and a spiral blade 46B formed on the outer circumference of the shaft 46A, and transports the toner with the blade 46B when the shaft 46A rotates. As shown in FIG. 4, the shaft 46A is disposed so as to extend in the front-rear direction, and the front-rear direction is the axial direction. FIG. 4 illustrates the blade 46B in a simplified manner.

The shaft 46A of the transport part 46 is rotationally driven by the driving source 38 that drives the transfer belt 24. In other words, in this exemplary embodiment, the transport part 46 and the transfer belt 24 are rotated by the same driving source 38. The transport part 46 rotates while the transfer belt 24 rotates, and stops when the transfer belt 24 stops.

In the transport part 46, as a result of the shaft 46A being rotationally driven by the driving source 38, the blade 46B transports the toner to one side (for example, the rear side) in the front-rear direction and discharges the toner to, for example, an output part (not shown).

Elastic Plates

The elastic plates 48 shown in FIG. 3 are an example of an applying part. The elastic plates 48 are attached to the transport part 46, rotate with the transport part 46, and strike the blade 44 to apply an impact to the blade 44.

As shown in FIG. 4, the elastic plates 48 are formed in a rectangular plate shape. The elastic plates 48 are attached to portions of the transport part 46 in the axial direction. In other words, the length of the elastic plates 48 in the front-rear direction is smaller than the length of the transport part 46 in the front-rear direction.

Furthermore, the elastic plates 48 are attached to the shaft 46A of the transport part 46. More specifically, the elastic plates 48 are attached to the shaft 46A, at positions away from the blade 46B in the axial direction. In other words, the elastic plates 48 are attached to non-forming portions in the shaft 46A where the blade 46B is not formed. The length of the elastic plates 48 in the front-rear direction is smaller than the helical pitch PA (see FIG. 4) of the transport part 46. The helical pitch PA is the length of the blade 46B in the axial direction per 360 degrees (one round) in the circumferential direction of the shaft 46A.

The elastic plates 48 are elastic bodies attached to the transport part 46 so as to protrude radially outward, and protruding portions are bendable elastic bodies. More specifically, the elastic plates 48 are resin plates.

Furthermore, the elastic plates 48 are attached to the shaft 46A at different positions in the axial direction of the transport part 46. In this exemplary embodiment, as shown in FIG. 4, for example, ends of four elastic plates 48 are attached to the shaft 46A at intervals in the front-rear direction. The four elastic plates 48 are attached to the same position in the rotation direction of the transport part 46.

When the transport part 46 rotates, the elastic plates 48 strike a non-supported portion 44C of the blade 44, which is closer to the tip 44A than the portion supported by the housing 42 is. More specifically, the elastic plates 48 strike a portion of the non-supported portion 44C near the tip 44A. Furthermore, the elastic plates 48 strike the blade 44 in an area through which a recording medium P passes. In other words, the elastic plates 48 strike the blade 44 at a position where the blade 44 is in contact with a portion of the transfer belt 24 with which a recording medium P comes into contact.

As described above, the transport part 46 rotates while the transfer belt 24 rotates, and stops when the transfer belt 24 stops. Hence, while the transfer belt 24 rotates, the elastic plates 48 rotate with the transport part 46 and strike the blade 44 to apply an impact to the blade 44. When the transfer belt 24 stops, the elastic plates 48 stop applying an impact to the blade 44.

Releasing Part

The releasing part 43 is provided in the rotation path of the elastic plates 48 and releases the rotating elastic plates 48 to make the elastic plates 48 strike the blade 44. The releasing part 43 is attached to the housing 42. As shown in FIG. 3, in the releasing part 43, a tip 43A protruding downward comes into contact with the tips of the elastic plates 48 rotating with the transport part 46 and releases the elastic plates 48 toward the blade 44.

In FIG. 3, the elastic plates 48 whose tips are in contact with the tip 43A of the releasing part 43 are illustrated by a solid line, and the elastic plates 48 in contact with the blade 44 after being released are illustrated by a two-dot chain line.

Operation of Exemplary Embodiment

In this exemplary embodiment, the elastic plates 48 attached to the transport part 46 rotate with the transport part 46 and strike the blade 44 to applying an impact to the blade 44. As a result, the blade 44 vibrates, and foreign matter (for example, paper dust and an external additive contained in the toner) caught between the blade 44 and the transfer belt 24 is removed.

In the case where foreign matter caught between the blade 44 and the transfer belt 24 is removed by vibrating the blade 44 by applying a voltage (hereinbelow, a configuration A), a dedicated special power source for applying a voltage is required, making the apparatus expensive.

In contrast, in this exemplary embodiment, as described above, the elastic plates 48 rotate with the transport part 46 and strike the blade 44 to apply an impact to the blade 44. Hence, compared with the configuration A, foreign matter caught between the blade 44 and the transfer belt 24 is removed at low cost. As a result, defects in an image to be transferred to a recording medium P are suppressed at low cost.

In this exemplary embodiment, the transport part 46 that transports the toner scraped off by the blade 44 serves as the rotation part to which the elastic plates 48 are attached. Hence, compared with a case where the scraping device 40 includes a rotation part to which the elastic plates 48 are attached separately from the transport part 46, the component count is reduced.

Furthermore, in this exemplary embodiment, the elastic plates 48 are attached to the shaft 46A of the transport part 46. Hence, compared with a case where the elastic plates 48 are attached to the blade 46B that transports the toner in the transport part 46, toner transport failure is suppressed.

More specifically, in this exemplary embodiment, the elastic plates 48 are attached to the shaft 46A, at positions away from the blade 46B in the axial direction. Hence, compared with a case where the elastic plates 48 are attached to the shaft 46A so as to be in contact with the blade 46B, toner transport failure is suppressed.

Furthermore, in this exemplary embodiment, the elastic plates 48 are attached to portions of the transport part 46 in the axial direction. If the elastic plates 48 are attached to the entire transport part 46 in the axial direction (hereinbelow, a configuration B), the rotational resistance of the transport part 46 is high. In contrast, in this exemplary embodiment, as described above, because the elastic plates 48 are attached to portions of the transport part 46 in the axial direction, rotation failure of the transport part 46 is reduced compared with the configuration B.

Furthermore, in this exemplary embodiment, multiple elastic plates 48 are attached to the shaft 46A at different positions in the axial direction of the transport part 46. Hence, compared with a case where the elastic plates 48 are attached to one place in the axial direction of the transport part 46, foreign matter caught between the blade 44 and the transfer belt 24 is evenly removed.

Furthermore, in this exemplary embodiment, the elastic plates 48, serving as an example of the applying part, are attached so as to protrude radially outward from the transport part 46, and protruding portions are bendable elastic bodies.

Thus, compared with a case where the applying parts are rigid bodies, the impact applied to the blade 44 with an elastic force is high. Thus, foreign matter caught between the blade 44 and the transfer belt 24 is more effectively removed.

Furthermore, in this embodiment, the releasing part 43 provided in the rotation path of the elastic plates 48 releases the rotating elastic plates 48 to make the elastic plates 48 strike the blade 44. Thus, compared with a case where the elastic plates 48 in a free state strike the blade 44, a higher impact is applied to the blade 44. Thus, foreign matter caught between the blade 44 and the transfer belt 24 is more effectively removed.

Furthermore, in this exemplary embodiment, the elastic plates 48 strike the non-supported portion 44C of the blade 44, which is closer to the tip 44A than the portion supported by the housing 42 is. Hence, compared with a case where the elastic plates 48 strike the portion of the blade 44 supported by the housing 42, the blade 44 is more likely vibrate, and foreign matter caught between the blade 44 and the transfer belt 24 is more effectively removed.

More specifically, in this exemplary embodiment, the elastic plates 48 strike a portion of the non-supported portion 44C near the tip 44A. Hence, compared with a case where the elastic plates 48 strike a portion of the non-supported portion 44C near the base end 44B, the blade 44 is more likely vibrate, and foreign matter caught between the blade 44 and the transfer belt 24 is more effectively removed.

Furthermore, in this exemplary embodiment, the transport part 46 rotates while the transfer belt 24 rotates. Hence, while the transfer belt 24 rotates, the elastic plates 48 rotate with the transport part 46 and strike the blade 44 to apply an impact to the blade 44.

Thus, compared with a case where the transport part 46 rotates only while the transfer belt 24 stops, foreign matter caught between the blade 44 and the transfer belt 24 while the transfer belt 24 rotates is more quickly removed. Thus, adhesion of the foreign matter caught between the blade 44 and the transfer belt 24 to the blade 44 is suppressed.

Furthermore, in this exemplary embodiment, the transport part 46 stops when the transfer belt 24 stops. This extends the life of the elastic plates 48 compared with a case where the transport part 46 rotates while the transfer belt 24 stops.

In this exemplary embodiment, the transport part 46 and the transfer belt 24 are rotated by the same driving source 38. Thus, compared with a case where the transport part 46 and the transfer belt 24 are rotated by different driving sources, driving control for rotating and stopping the transport part 46 and the transfer belt 24 is easy.

Furthermore, in this exemplary embodiment, the elastic plates 48 strike the blade 44 in the area through which a recording medium P passes. Hence, compared with a case where the elastic plates 48 strike the blade 44 in an area other than the area through which the recording medium P passes, the paper dust caught between the blade 44 and the transfer belt 24 is more effectively removed.

First Modification

Figure 5:
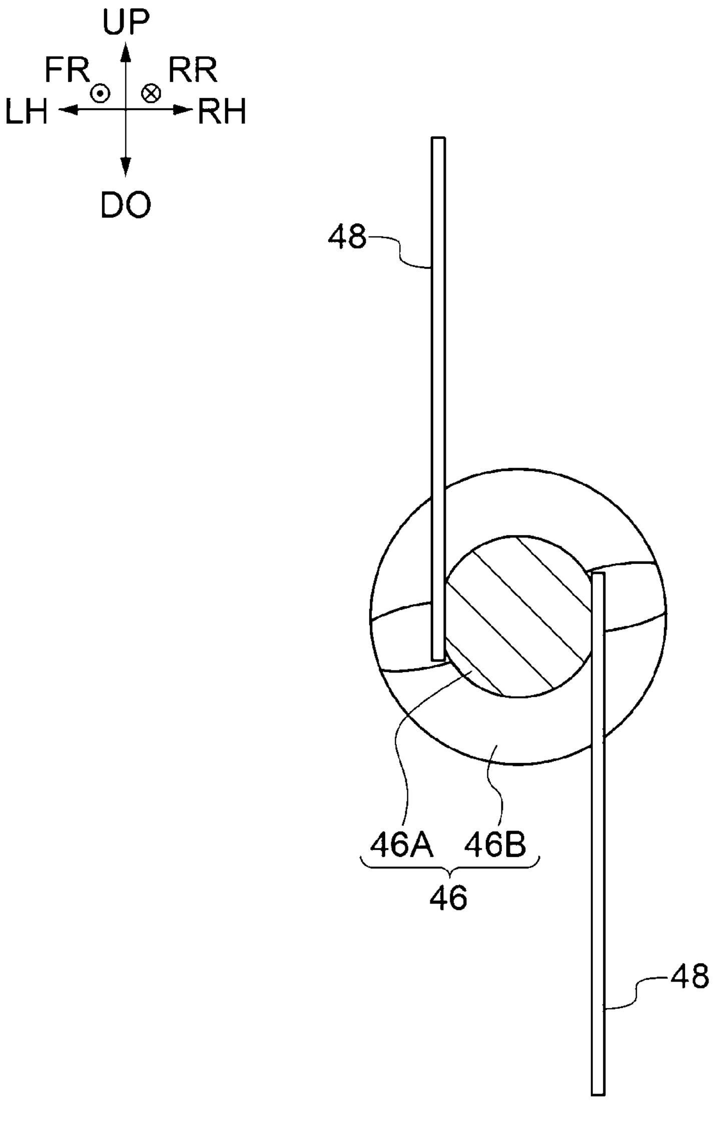
FIG. 5 schematically shows a transport part and elastic plates according to a modification.

In the exemplary embodiment, although the multiple elastic plates 48 are attached to the transport part 46 at the same position in the rotation direction thereof, the configuration is not limited thereto. For example, as shown in FIG. 5, the multiple elastic plates 48 may be attached to the transport part 46 at different positions in the rotation direction thereof.

In this modification, compared with a case where the multiple elastic plates 48 are attached to one place (i.e., the same position) in the rotation direction of the transport part 46, the number of times the elastic plates 48 strike the blade 44 per rotation of the transport part 46 is large. Hence, foreign matter caught between the blade 44 and the transfer belt 24 is more effectively removed.

Second Modification

Figure 6:
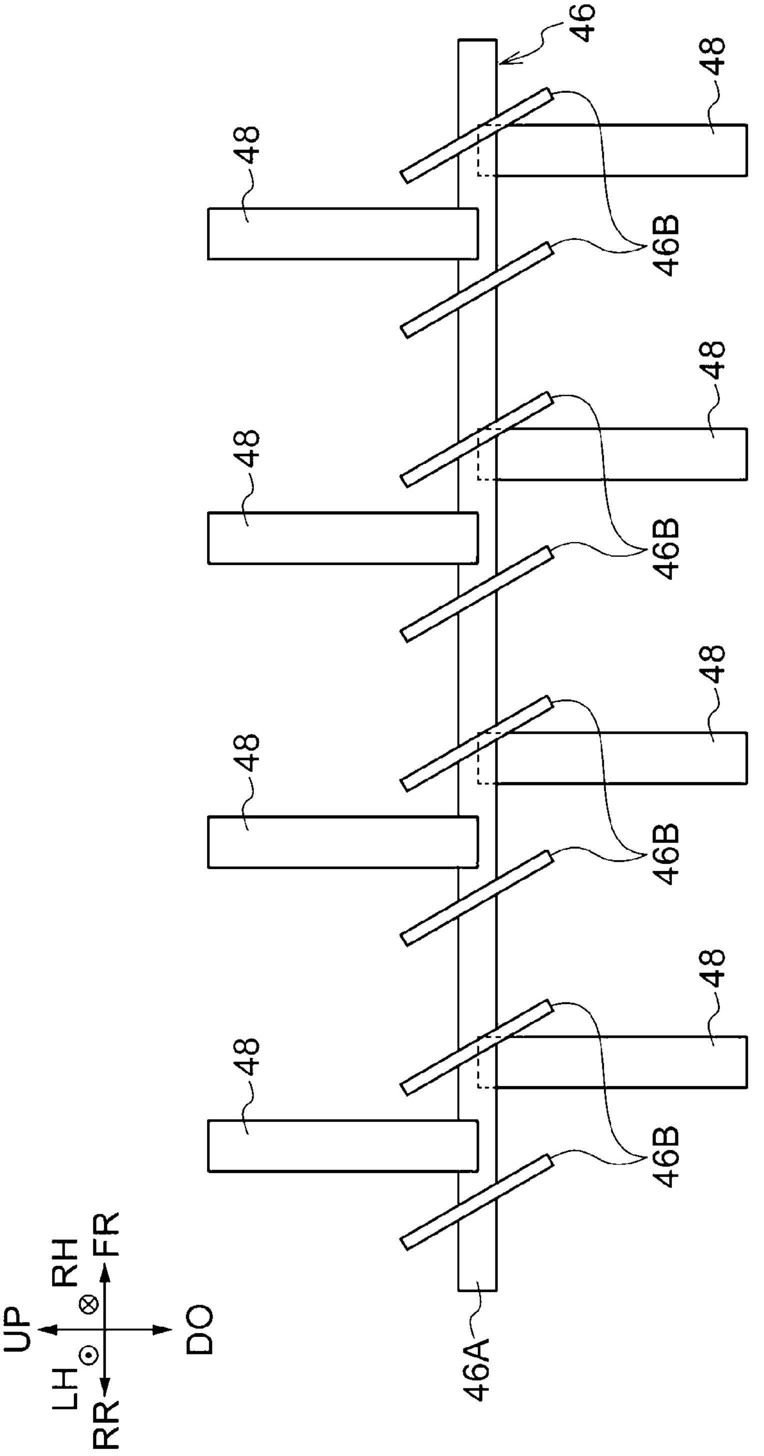
FIG. 6 is a side view of a transport part and elastic plates according to a modification.

Furthermore, as shown in FIG. 6, the multiple elastic plates 48 may be attached to the transport part 46 at different positions both in the rotation direction and the axial direction thereof.

In this modification, the number of times the elastic plates 48 strike the blade 44 per rotation of the transport part 46 is larger than that in the case where the elastic plates 48 are attached to one place in the axial direction of the transport part 46 and at different positions in the rotation direction of the transport part 46. Hence, foreign matter caught between the blade 44 and the transfer belt 24 is evenly removed in the axial direction.

Other Modifications

Figure 7:
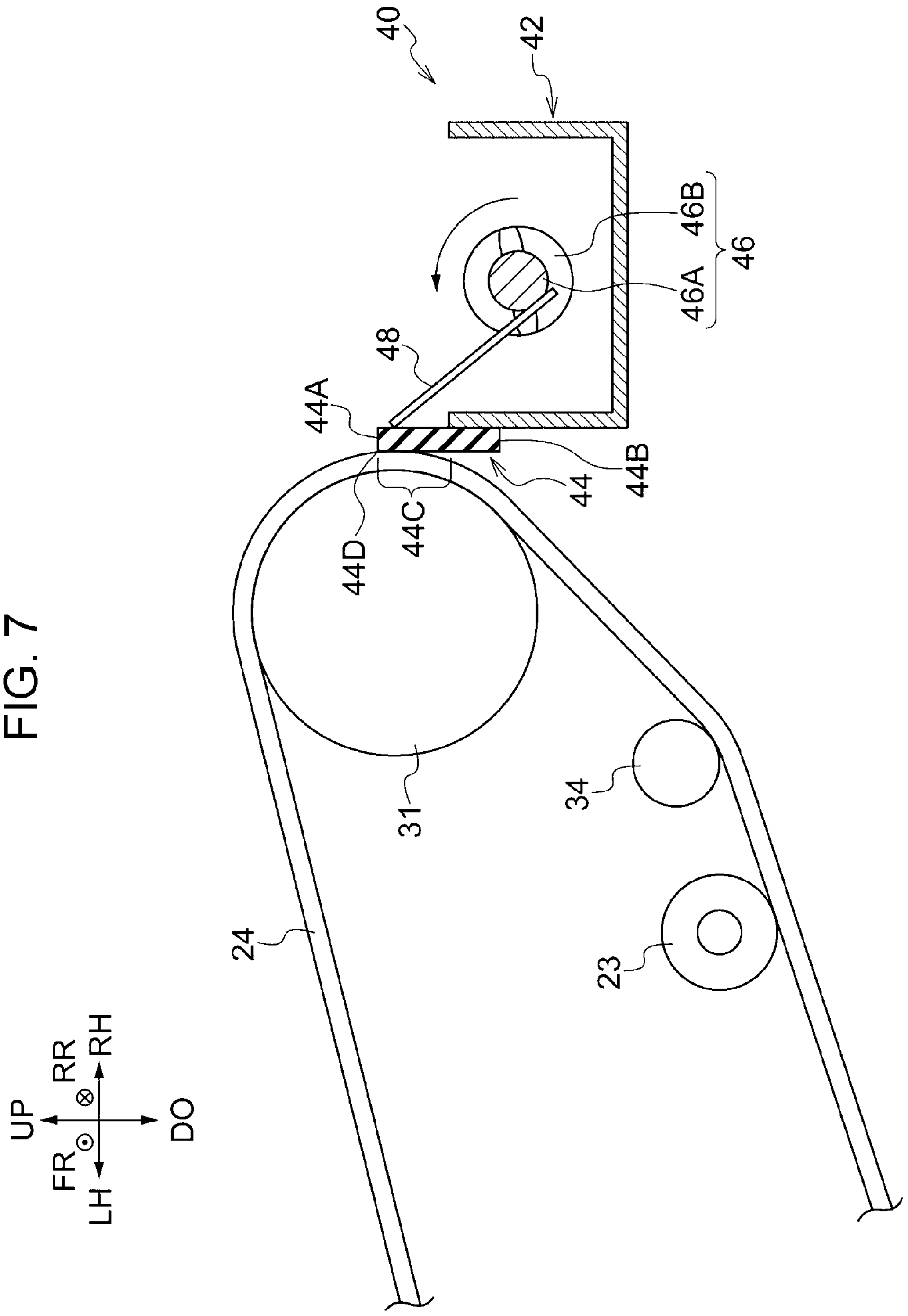
FIG. 7 schematically shows a scraping device according to a modification.

In this exemplary embodiment, although the scraping device 40 includes the releasing part 43, the releasing part 43 may be omitted as shown in FIG. 7. Specifically, the elastic plates 48 in a free state may strike the blade 44.

In this exemplary embodiment, although the transfer belt 24 is an example of the contact part and the holding member, the configuration is not limited thereto. Examples of the contact part and the holding member include a transfer drum, a photoreceptor (such as a photoreceptor drum and a photoreceptor belt), and anything to which extraneous matter can attach.

In the case where a photoreceptor is an example of the contact part and the holding member, the image forming unit 14 may directly transfer an image from the photoreceptor to a recording medium P without using the transfer belt 24.

In this exemplary embodiment, although an example of the attached matter is toner, the attached matter is not limited to the toner. Examples of the attached matter include ink, powder other than toner, and anything that is attached to something.

In this exemplary embodiment, although the blade 44 is an example of the scraping part, the scraping part is not limited to the blade 44. Examples of the scraping part include a scraper and any other components that scrape off attached matter. The scraper is made of, for example, metal, resin, or the like.

In this exemplary embodiment, although the transport part 46 is an example of the rotation part, the rotation part is not limited to the transport part 46. Examples of the rotation part include a transport roller and any other components that rotate. Hence, the scraping device 40 may include a rotation part to which the elastic plates 48 are attached, separately from the transport part 46.

In this exemplary embodiment, although the elastic plates 48 are an example of the applying part, the applying part is not limited to the elastic plates 48. Examples of the applying part include a metal plate, a rod body made of a resin and a metal, and any other components that apply an impact to the scraping part by striking the scraping part.

In this exemplary embodiment, although the elastic plates 48 are attached to the shaft 46A of the transport part 46, the configuration is not limited thereto. For example, the elastic plates 48 may be attached to the blade 46B that transports the toner in the transport part 46.

Furthermore, in this exemplary embodiment, although the elastic plates 48 are attached to the shaft 46A at positions away from the blade 46B in the axial direction, the configuration is not limited thereto. For example, the elastic plates 48 may be attached to the shaft 46A so as to be in contact with the blade 46B.

In this exemplary embodiment, although the elastic plates 48 are attached to portions of the transport part 46 in the axial direction, the configuration is not limited thereto. For example, the elastic plates 48 may be attached to the entire transport part 46 in the axial direction thereof.

In this exemplary embodiment, although the multiple elastic plates 48 are attached to the shaft 46A at different positions in the axial direction of the transport part 46, the configuration is not limited thereto. For example, the elastic plates 48 may be attached to one place in the axial direction of the transport part 46.

In this exemplary embodiment, although the elastic plates 48, serving as an example of the applying part, are attached so as to protrude radially outward from the transport part 46, and the protruding portions are bendable elastic bodies, the configuration is not limited thereto. For example, the applying part may be a rigid body.

In this exemplary embodiment, although the elastic plates 48 strike a portion of the non-supported portion 44C near the tip 44A, the configuration is not limited thereto. For example, the elastic plates 48 may strike a portion of the non-supported portion 44C near the base end 44B. Furthermore, for example, the elastic plates 48 may strike a portion of the blade 44 supported by the housing 42.

In this exemplary embodiment, although the transport part 46 rotates while the transfer belt 24 rotates, the configuration is not limited thereto. For example, the transport part 46 may rotate while the transfer belt 24 stops. Specifically, the elastic plates 48 may strike the blade 44 while the transfer belt 24 stops.

In this exemplary embodiment, although the transport part 46 and the transfer belt 24 are rotated by the same driving source 38, the configuration is not limited thereto. For example, the transport part 46 and the transfer belt 24 may be rotated by different driving sources.

In this exemplary embodiment, although the elastic plates 48 strike the blade 44 in an area through which a recording medium P passes, the configuration is not limited thereto. The elastic plates 48 may strike the blade 44 in an area other than the area through which a recording medium P passes.

The present disclosure is not limited to the above-described embodiment, and various modifications, changes, and improvements can be made without departing from the gist of the present disclosure. For example, multiple modifications described above may be combined as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A scraping device comprising:

- a scraping part that comes into contact with a rotating contact part to scrape off attached matter attached to the contact part;
- a rotation part that rotates; and
- an applying part that is attached to the rotation part, rotates with the rotation part, and strikes the scraping part to apply an impact to the scraping part.

(((2)))

The scraping device according to (((1))), wherein the rotation part is a transport part that transports the attached matter scraped off by the scraping part.

(((3)))

The scraping device according to (((2))), wherein the transport part includes a shaft and a spiral blade formed on an outer circumference of the shaft, the blade transports the attached matter as the shaft rotates, and the applying part is attached to the shaft.

(((4)))

The scraping device according to (((3))), wherein the applying part is attached to the shaft at a position away from the blade in an axial direction.

(((5)))

The scraping device according to any one of (((1))) to (((4))), wherein the applying part is attached to a portion of the rotation part in an axial direction.

(((6)))

The scraping device according to (((5))), wherein the applying part includes a plurality of applying parts attached to the rotation part at different positions in the axial direction thereof.

(((7)))

The scraping device according to any one of (((1))) to (((6))), wherein the applying part includes a plurality of applying parts attached to the rotation part at different positions in a rotation direction thereof.

(((8)))

The scraping device according to (((7))), wherein the applying part includes a plurality of applying parts attached to the rotation part at different positions both in the rotation direction and the axial direction thereof.

(((9)))

The scraping device according to any one of (((1))) to (((8))), wherein the applying part is attached to the rotation part so as to protrude radially outward, and a protruding portion is a bendable elastic body.

(((10)))

The scraping device according to (((9))), further comprising a releasing part that is provided in a rotation path of the applying part and that releases the rotating applying part to make the applying part strike the scraping part.

(((11)))

The scraping device according to any one of (((1))) to (((10))), wherein the scraping part is in contact with the contact part at a tip thereof and is held by a holding part at a base end thereof, and the applying part strikes a non-supported portion of the scraping part, the non-supported portion being closer to the tip than the portion held by the holding part is.

(((12)))

The scraping device according to (((11))), wherein the applying part strikes a portion of the non-supported portion near the tip.

(((13)))

The scraping device according to any one of (((1))) to (((12))), wherein the rotation part rotates while the contact part rotates.

(((14)))

The scraping device according to (((13))), wherein the rotation part stops when the contact part stops.

(((15)))

The scraping device according to (((13))) or (((14))), wherein the rotation part and the contact part are rotated by a same driving source.

(((16)))

An image forming apparatus comprising:

- a holding member, serving as a contact part, that holds an image to be transferred to a recording medium, the image being formed of toner, serving as attached matter; and
- the scraping device according to any one of (((1))) to (((15))) in which the scraping part scrapes off the toner.

(((17)))

The image forming apparatus according to (((16))), wherein the scraping device is configured such that the applying part strikes the scraping part in an area through which paper, serving as the recording medium, passes.

What is claimed is:

1. A scraping device comprising:

- a scraping part configured to contact a rotating contact part to scrape off attached matter attached to the contact part;
- a rotation part configured to rotate; and
- an applying part that is attached to the rotation part, is configured to rotate with the rotation part, and is configured to strike the scraping part to apply an impact to the scraping part,
- wherein the applying part is configured to rotate about a same axis as the rotation part, and a position where the applying part is attached to the rotation part is not changed in accordance with a rotation of the rotation part,
- wherein the rotation part is a transport part configured to transport the attached matter scraped off by the scraping part,
- wherein the transport part includes a shaft and a spiral blade formed on an outer circumference of the shaft,
- wherein the blade is configured to transport the attached matter as the shaft rotates, and
- wherein the applying part is attached to the shaft.

2. The scraping device according to claim 1, wherein the applying part is attached to the shaft at a position away from the blade in an axial direction.

3. The scraping device according to claim 1, wherein the applying part is attached to a portion of the rotation part in an axial direction.

4. The scraping device according to claim 3, wherein the applying part includes a plurality of applying parts attached to the rotation part at different positions in the axial direction thereof.

5. The scraping device according to claim 1, wherein the applying part includes a plurality of applying parts attached to the rotation part at different positions in a rotation direction thereof.

6. The scraping device according to claim 5, wherein the applying part includes a plurality of applying parts attached to the rotation part at different positions both in the rotation direction and the axial direction thereof.

7. The scraping device according to claim 1, wherein the applying part is attached to the rotation part so as to protrude radially outward, and a protruding portion thereof comprise a bendable elastic body.

8. The scraping device according to claim 7, further comprising a releasing part that is provided in a rotation path of the applying part and that is configured to release the rotating applying part to make the applying part strike the scraping part.

9. The scraping device according to claim 1, wherein:

- the scraping part is in contact with the contact part at a tip thereof and is held by a holding part at a base end thereof; and
- the applying part is configured to strike a non-supported portion of the scraping part, the non-supported portion being closer to the tip than the portion held by the holding part is.

10. The scraping device according to claim 9, wherein the applying part is configured to strike a portion of the non-supported portion near the tip.

11. The scraping device according to claim 1, wherein the rotation part is configured to rotate while the contact part rotates.

12. The scraping device according to claim 11, wherein the rotation part is configured to stop when the contact part stops.

13. The scraping device according to claim 12, wherein the rotation part and the contact part are configured to be rotated by a same driving source.

14. An image forming apparatus comprising:

a holding member, serving as a contact part, configured to hold an image to be transferred to a recording medium, the image being formed of toner, serving as attached matter; and the scraping device according to claim 1 in which the scraping part scrapes off the toner.

15. An image forming apparatus comprising:

a holding member, serving as a contact part, configured to hold an image to be transferred to a recording medium, the image being formed of toner, serving as attached matter; and a scraping device comprising:

a scraping part configured to contact a rotating contact part to scrape off attached matter attached to the contact part;

a rotation part configured to rotate; and an applying part that is attached to the rotation part, is configured to rotate with the rotation part, and is configured to strike the scraping part to apply an impact to the scraping part, wherein the rotation part is a transport part configured to transport the attached matter scraped off by the scraping part, wherein the transport part includes a shaft and a spiral blade formed on an outer circumference of the shaft; shaft, wherein the blade is configured to transport the attached matter as the shaft rotates, wherein the applying part is attached to the shaft, and wherein the scraping part is configured to scrape off the toner.

16. An image forming apparatus comprising:

a holding member, serving as a contact part, configured to hold an image to be transferred to a recording medium, the image being formed of toner, serving as attached matter; and a scraping device comprising:

a scraping part configured to contact a rotating contact part to scrape off attached matter attached to the contact part;

a rotation part configured to rotate; and an applying part that is attached to the rotation part, is configured to rotate with the rotation part, and is configured to strike the scraping part to apply an impact to the scraping part, wherein the rotation part is a transport part configured to transport the attached matter scraped off by the scraping part, wherein the transport part includes a shaft and a spiral blade formed on an outer circumference of the shaft, wherein the blade is configured to transport the attached matter as the shaft rotates, wherein the applying part is attached to the shaft, wherein the applying part is attached to the shaft at a position away from the blade in an axial direction, and wherein the scraping part is configured to scrape off the toner.

17. The image forming apparatus according to claim 14, wherein the scraping device is configured such that the applying part strikes the scraping part in an area through which paper, serving as the recording medium, passes.

* * * * *